United States Patent [19]

Uesaka et al.

[11] Patent Number: 4,544,591
[45] Date of Patent: Oct. 1, 1985

[54] PERPENDICULAR MAGNETIC RECORDING MEDIUM

[75] Inventors: Yasutaro Uesaka, Kokubunji; Sadao Hishiyama, Sayama; Masahiro Kitada, Tokyo; Noboru Shimizu, Tokorozawa; Hideo Tanabe, Hachioji; Hideo Fujiwara, Tokorozawa, all of Japan

[73] Assignees: Hitachi, Ltd, Tokyo; Hitachi Maxell, Ltd., Osaka, both of Japan

[21] Appl. No.: 537,512

[22] Filed: Sep. 30, 1983

[30] Foreign Application Priority Data

Oct. 1, 1982 [JP] Japan ................. 57-171058

[51] Int. Cl.⁴ ............................................. G11B 25/04
[52] U.S. Cl. ..................... 428/65; 428/694; 428/216; 428/472; 428/900
[58] Field of Search ............. 428/694, 65, 216, 469, 428/472, 900, 213; 204/192 C, 192 M

[56] References Cited

U.S. PATENT DOCUMENTS

| | | |
|---|---|---|
| 3,515,606 | 6/1970 | Crowther ................ 428/900 |
| 3,929,604 | 12/1975 | Shirahata et al. .......... 204/192 M |
| 4,075,384 | 2/1978 | Suzuki et al. ............... 428/900 |
| 4,210,946 | 7/1980 | Iwasaki et al. ............. 428/212 |
| 4,277,809 | 7/1981 | Fisher et al. ............... 428/212 |
| 4,391,874 | 7/1983 | Yamamoto et al. ......... 428/694 |
| 4,410,590 | 10/1983 | Kawashara et al. ......... 428/900 |
| 4,438,066 | 3/1984 | Aboaf et al. ............... 428/928 |
| 4,454,195 | 6/1984 | Fukuda et al. ............. 204/192 M |

FOREIGN PATENT DOCUMENTS 29028 9/1983 Japan .

Primary Examiner—George F. Lesmes
Assistant Examiner—William M. Atkinson
Attorney, Agent, or Firm—Antonelli, Terry & Wands

[57] ABSTRACT

In a perpendicular magnetic recording medium comprising a high permeability film and a perpendicular magnetization film which are laminated on a non-magnetic substrate, a perpendicular magnetic recording medium is provided wherein a permanent magnet film is further sandwiched between the non-magnetic substrate and the high permeability film, thereby eliminating a spike noise.

25 Claims, 6 Drawing Figures

PERPENDICULAR MAGNETIC RECORDING MEDIUM

The present invention relates to a perpendicular magnetic recording medium which is used in perpendicular magnetic recording.

In a perpendicular magnetic recording method, a magnetic recording medium, such as a magnetic tape or magnetic disc, is used, and on the surface of the magnetic recording medium a magnetic medium layer (perpendicular magnetization film) for magnetic recording is fabricated. And the magnetic medium layer has a magnetic easy axis in the direction perpendicular to the run direction of the magnetic recording medium, i.e. in the direction of thickness of the magnetic recording medium, and the magnetic recording medium is magnetized in the direction of thickness using a perpendicular magnetic recording head adapted to cause a strong magnetization distribution in the direction of thickness of this magnetic recording medium, thereby trapping the magnetization of the magnetic medium layer in this direction. In this way, the presence of residual magnetization distribution in the direction of thickness of the magnetic recording medium will suppress the occurrence of self-demagnetization field, thereby enabling the high density recording with little loss of recording information (for example, refer to Japanese Patent Application Laid-open No. 134706/77).

With regard to perpendicular magnetic recording media to be used for the perpendicular magnetic recording method as described above, two perpendicular magnetic recording media are known: one having a double layer structure such that a magnetic layer (perpendicular magnetization film) having a magnetic easy axis in the direction perpendicular to the medium surface is formed through a high permeability magnetic layer on a non-magnetic substrate, and the other having a single layer structure consisting of only a perpendicular magnetization film without a high permeability film. The former is known to have a higher characteristic than the latter (for example, refer to Japanese Patent Application Laid-open No. 78403/77).

However, a spike noise (big and sharp noises) could be observed if the experiment of recording and reproducing is performed using such a magnetic recording medium as mentioned above in which the high permeability magnetic layer exists under the perpendicular magnetization film. Although the above-mentioned spike noise is disclosed in the specifications of the pending Japanese patent application and the pending European patent application, these applications are not yet published, hence not publicly known.

This spike noise is not observed when the experiment of recording and reproducing is performed using the magnetic recording medium having a single layer structure consisting of only a perpendicular magnetization film.

A spike noise which is substantially similar to that observed when using a medium having a double layer structure consisting of such perpendicular magnetization film and high permeability film as stated above is observed even when using a medium consisting of only high permeability magnetic layer without a perpendicular magnetization film. That is, the spike noise is not caused by an interaction between the high permeability film and the perpendicular magnetization film formed thereon but only by the high permeability magnetic layer.

The following references are cited to show the state of the art; (i) U.S. Pat. No. 3,120,001, (ii) Japanese Patent Application Laid-open Publication, Laid-open No. 134706/77, (iii) Japanese Patent Application Laid-open Publication, Laid-open No. 78403/77, and (iv) Japanese Patent Application Laid-open Publication, Laid-open No. 51804/79.

It is an object of the present invention to provide a perpendicular magnetic recording medium with high performance which does not cause a spike noise.

The present inventors have confirmed that the occurrence of a spike noise can be eliminated in a conventional perpendicular magnetic recording medium in which a high permeability film and a perpendicular magnetization film are formed on a non-magnetic substrate, if a thin film with a large coercive force, i.e. so-called permanent magnet film is further provided between the non-magnetic substrate and the high permeability film. In this case, the permanent magnet film means a magnetic film having a coercive force of 100 Oe or more, and it is preferable that a thickness of that film is 0.02 $\mu$m or more, and more preferably 0.1 $\mu$m or more. A thinner magnetic film than the film with a thickness of 0.02 $\mu$m will hardly provide any effect. The thickness of the permanent magnet film is up to 1/5 of the width of the track on a disc. If the thickness thereof is larger than that, the magnetization in the permanent magnet will contain components in the direction of film thickness due to the demagnetization field, resulting in less effect.

In the case where, as a perpendicular magnetization film, there is used a Co-Cr alloy which is conventionally used, an alloy in which a third element (other than Co and Cr) was added to a Co-Cr alloy, a Co-Ru alloy, a Co-V alloy, a Co-W alloy or the like, it is desirable that the high permeability film formed on the permanent magnet film be preferentially an amorphous magnetic alloy. This is because the perpendicular magnetic anisotropy of the alloy film of the Co-Cr system mentioned above closely relates to the orientation in the direction perpendicular to the film surface of the c axis of a hcp crystal having the close packed hexagonal lattice, and because the orientation in the direction perpendicular to the film surface of the c axis of the hcp crystal of the Co-Cr system alloy film on the thin film which is preferentially amorphous magnetic metal is better than the orientation in the direction perpendicular to the film surface of the c axis of the hcp crystal of the Co-Cr system alloy film on the crystalline film, e.g. Ni-Fe alloy film. However, there is no inconvenience with a Ni-Fe alloy. As an amorphous magnetic alloy with high permeability, it is possible to use a publicly known alloy, such as Co-Zr-Mo system, Co-Zr-Ti system, Co-Ti system, or the like. It is preferable that the thickness of that film is within a range of 0.1-5 $\mu$m. A film having a thickness of 0.1 $\mu$m or less does not provide an effect of the high permeability film, and a film having a thickness of 0.5 $\mu$m or more results in the reduction of permeability.

Furthermore, if a non-magnetic insulating film consisting of SiO$_2$, Al$_2$O$_3$ or the like having a thickness of about 20-30 Å to 1 $\mu$m is interposed between the aforestated permanent magnet film and the high permeability film, the characteristic as the perpendicular magnetic recording medium can be further improved as compared with the case where this non-magnetic insulating film is not used. For example, the hysteresis curves of the high permeability films were measured by the magnetic Kerr effect in the following three cases: where the high permeability film is directly formed on the permanent magnet film; where the sputter $SiO_2$ film having a thickness of 0.2 μm is interposed between the permanent magnet film and the high permeability film; and where the high permeability film is directly formed on the non-magnetic substrate. It has been confirmed from these experiments that although there are similarity between the hysteresis curve of the high permeability film which was directly formed on the non-magnetic substrate and the hysteresis curve of the high permeability film which was formed on the $SiO_2$ film on the permanent magnet film, the hysteresis curve of the high permeability film which was directly formed on the permanent magnet film is quite different from the other two curves and the magnetism of this high permeability film has become slightly harder.

Actually, the perpendicular magnetic recording medium which comprises an underlayer film having a permanent magnet film, a high permeability film, and a non-magnetic insulating film interposed between the permanent magnet film and the high permeability film, and a perpendicular magnetization film formed on the high permeability film, shows better recording and reproducing characteristics than that of the perpendicular magnetic recording medium in which the perpendicular magnetization film is formed on an underlayer film without the above-mentioned non-magnetic insulating film.

In the case where a thickness of the perpendicular magnetization film which is the uppermost layer is too thin, the output levels upon recording and reproducing are low. On the contrary, in the case where the thickness of the perpendicular magnetization film is too thick, a larger current is needed for recording and the S/N ratio also deteriorates since the effect of the high permeability film is diminished. From this point, the thickness of the perpendicular magnetization film is preferably set into 0.03–0.3 μm, and more desirably into 0.1–0.2 μm.

However, in the case where a Co-Cr alloy film, a thin film in which a third element (other than Co and Cr) was added to the Co-Cr alloy, a Co-Ru alloy film or the like is used as a perpendicular magnetization film, if the thicknesses of these films are all less than 0.3 μm, the orientation of the c axis of the hcp crystal in the direction perpendicular to the film surface is inferior to that of the c axis of the hcp crystal of the film having a thickness of 0.3 μm or more in the direction perpendicular to the film surface; thus, it has been known that those films exhibit inferior perpendicular magnetic characteristics. As a method of improving such inferior films, a heat treatment in a vacuum, inert gas, or reducing gas is known. However, if the heat treatment is performed at too low temperature, no effect of the heat treatment will be obtained. On the other hand, too high temperature in the heat treatment will contrarily cause the perpendicular magnetic characteristics of the thin film of the Co-Cr system alloy to deteriorate. Although it is preferable to perform the above-mentioned heat treatment, the present invention may be performed even if the heat treatment is not executed.

FIG. 1 shows relations between the heat treatment temperatures of the thin Co-Cr alloy films having various thicknesses and the orientations (each of which is represented by the variation ratio of half width $\Delta\theta_{50}$ of rocking curve of the X-ray diffraction line on the (002) face of the hcp crystal) of the c axes of the hcp crystals of those thin films. In these diagrams, films having smaller values of $\Delta\theta_{50}$ exhibit the better perpendicular magnetic characteristics. The heat treatment was performed in a vacuum for two hours. Each numerical value added to the curves indicates the film thickness (μm).

It will be understood from FIG. 1 that the heat treatment temperature at which the perpendicular magnetic characteristic of the thin Co-Cr alloy film becomes maximum differs in dependence upon the thickness of that film and it can be assumed that the optimum heat treatment temperature is within a range from 350° to 550° C. when the film thickness is 0.05–0.3 μm, and that it is within the range of 400°–500° C. when the film thickness is 0.1–0.2 μm.

In the case where the preferentially amorphous thin metal film is used as the high permeability film on the permanent magnet film, the crystallization temperature of the high permeability film must be higher than the heat treatment temperature. If the crystallization temperature is lower than the heat treatment temperature, the metal film which is inherently preferentially amorphous will be crystallized in the heat treatment, causing the reduction of permeability.

In order to obtain the perpendicular magnetic recording medium with high performance, it is necessary to magnetize the permanent magnet film in the direction of the track width by applying the magnetic field in the direction of track width when the permanent magnet film and the high permeability film are formed or after they have been formed. As described later, the S/N ratio when the direction of the magnetic field to be applied coincides with the direction of track width is about 5 dB larger than the S/N ratio when the direction of the magnetic field to be applied coincides with the direction of bit length, and the recording current level in the former case is about 20% smaller than that in the latter case.

The strength of the above-mentioned magnetic field to be applied in the direction of track width in set into 2 Oe or more. If the strength of the magnetic field to be applied is less than 2 Oe, the effect of the magnetic field applied will be not much and this is unfavorable. The upper limit of the magnetic field strength is not particularly specified but will be limited depending upon the construction of the apparatus.

As a permanent magnet film which is used for this invention, a Co-Pt alloy film which has been invented by certain of the present inventors and their co-workers and disclosed in Japanese Patent Application No. 29028/82 and in the corresponding U.S. patent application Ser. No. 469,105, filed Feb. 23, 1983, and European Application EPC 83100209.2, claiming the priority based on the Japanese Patent Application (these applications have not published yet, hence not publicly known), a $Fe_2O_3$ film containing Co, Al-Ni-Co film or the like will be used.

In the case where the Co-Pt film is used as the permanent magnet film, as previously described with respect to the diagrams showing the relations between the composition ratio and the coercive force shown in FIG. 2, it is desirable to use a thin film having the coercive force of 100 Oe or more, i.e. the Co-Pt film which contains Pt whose content is within a range of 2–43 weight percent, and more preferably, to use the Co-Pt film containing Pt whose content is within a range of 15–25 weight percent.

With respect to the matters which are not set forth in the specification of the present application, conventional knowledges and technologies that are known in this technical field may be justifiably utilized.

The above and other objects, features and advantages of the present invention will be apparent from the following detailed description in conjunction with the accompanying drawings, in which.

The present invention will now be described in detail hereinbelow with respect to preferred examples.

EXAMPLE 1

Figure 1:
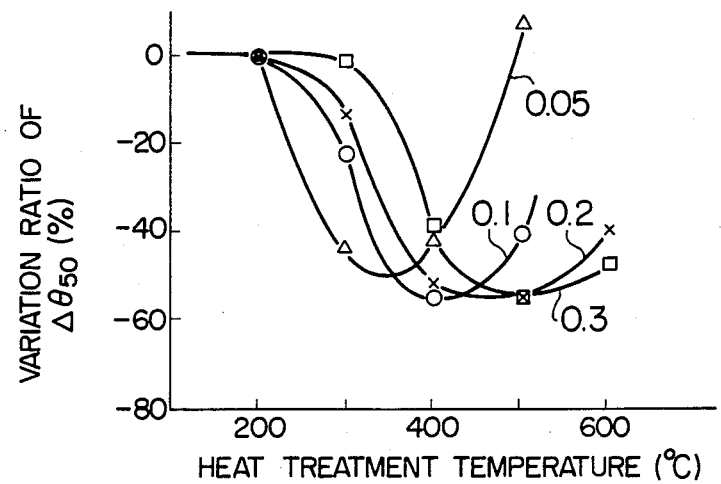
FIG. 1 is a diagram showing the relations between the heat treatment temperatures of the Co-Cr thin film having various thicknesses and the perpendicular magnetic characteristics (each of which is represented by the variation ratio of half width of rocking curve corresponding to the (002 face of the hcp crystal)
Figure 2:
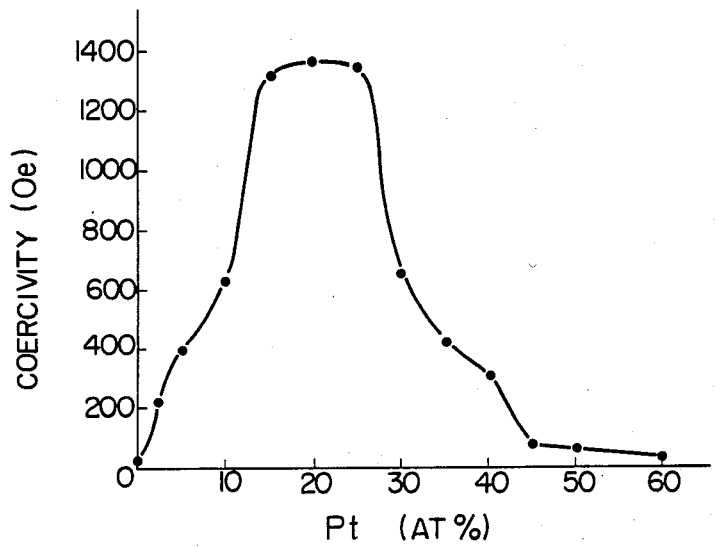
FIG. 2 is a diagram showing the relation between the content of Pt in the thin film of Co-Pt alloy and the coercive force.
Figure 3:
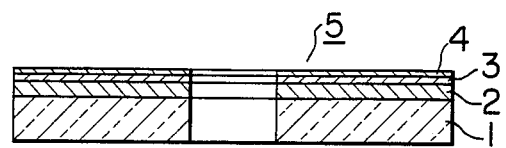
FIG. 3 is a cross sectional view of a perpendicular magnetic recording medium as a typical embodiment of the present invention.

As shown in FIG. 3, a $Co_{80}Pt_{20}$ alloy film 2 having a thickness of 1.0 $\mu$m was deposited by the sputtering method on an annular glass substrate 1 having a thickness of 5 mm and an outside diameter of 10 cm and an inside diameter of 2 cm, then a $Co_{80}Mo_{9.5}Zr_{10.5}$ alloy film 3 having a thickness of 0.5 $\mu$m was deposited on the alloy film 2 by the same sputtering method, thereafter a $Co_{80}Cr_{20}$ alloy film 4 having a thickness of 0.2 $\mu$m was deposited on the alloy film 3, thereby producing a recording medium 5.

Figure 4:
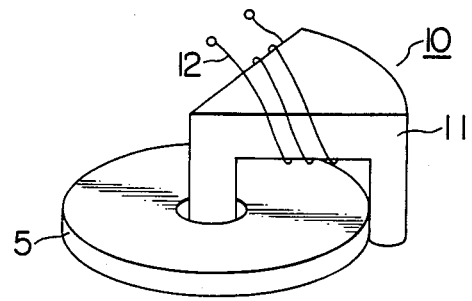
FIG. 4 is an explanatory view of a magnet used in one embodiment of the present invention.

In the above process, before the $Co_{80}Mo_{9.5}Zr_{10.5}$ alloy film 3 was produced of after it had been produced, radial magnetic fields that run toward the center of the recording medium 5 were applied to the recording medium 5 while rotating the recording medium 5 at 200 rpm using a magnet 10 having such a shape as shown in FIG. 4. The magnetic field strength applied was about 100 Oe on the average radius of the annular glass substrate. In FIG. 4, a reference numeral 5 is the recording medium; 10 is the magnet; 11 is a magnetic core having a fan-like portion; and 12 is a magnetization coil.

Figure 5A:
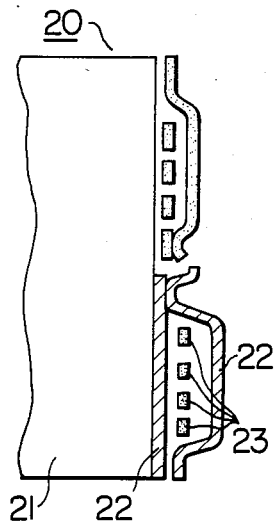
FIGS. 5A and 5B are explanatory views of a magnetic head for perpendicular magnetic recording that is used for recording in the recording medium obtained in one embodiment of the present invention.
Figure 5B:
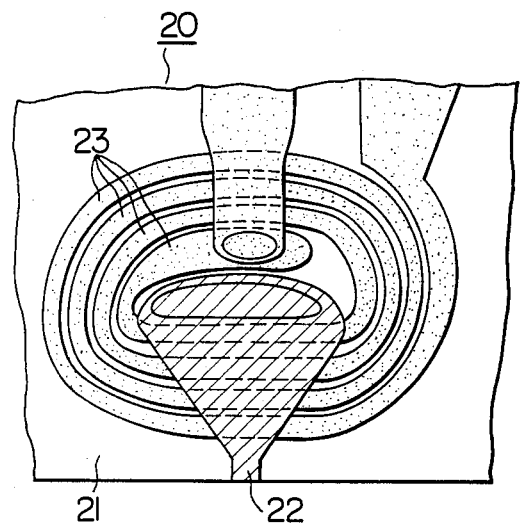

The recording was performed in the perpendicular magnetic recording medium which had been produced in this way using a magnetic head 20 for perpendicular magnetic recording with such a shape as shown in FIGS. 5A and 5B. FIG. 5A is a cross sectional view of the magnetic head 20 and FIG. 5B is a partial plan view thereof, which a reference numeral 21 is a non-magnet substrate; 22 is a magnetic film; and 23 is a coil. When thus recorded recording medium was played back using a ferrite magnetic head having a gap distance of 0.3 $\mu$m and whose number of turns is 20, no spike noise was measured. A recording current $I_{90}$ which produces an output of 90% of the maximum output at a recording density of 100 kFRPI is 100 mA, and when the recording density is 100 kFRPI and the recording frequency is 5 MHz and the band width is 10 MHz, the S/N ratio was 42 dB.

EXAMPLE 2

After the magnetic recording medium obtained in Example 1 has been subjected to heat treatment in a vacuum at 450° C. for two hours, the radial magnetic fields that run toward its center was applied again to the recording medium using the same magnet shown in FIG. 4.

The recording and reproducing were respectively performed with respect to the perpendicular magnetic recording medium which has been produced in such a manner as described above using the recording head and the playback head mentioned in Example 1; as a result of this, no spike noise was measured. In addition, when the recording density is 100 kFRPI, $I_{90}$ was 100 mA, and when the recording density is 100 kFRPI and the recording frequency is 5 MHz and the band width is 10 MHz, the S/N ratio was 45 dB.

It has been found from Examples 1 and 2 that if the permanent magnet film is used under the high permeability film, it is possible to eliminate the spike noise and that if the produced recording medium is subjected to the heat treatment, the perpendicular magnetic recording medium with higher performance can be realized.

EXAMPLE 3

A $Co_{80}Pt_{20}$ alloy film having a thickness of 1.0 $\mu$m was deposited by the sputtering method on an annular glass substrate having a thickness of 5 mm and an outside diameter of 10 cm and an inside diameter of 2 cm, then a $SiO_2$ film having a thickness of 0.2 $\mu$m was deposited thereon by the sputtering method, and a $Co_{80}Mo_{9.5}Zr_{10.5}$ alloy film having a thickness of 0.5 $\mu$m was further deposited thereon by the sputtering method, and thereafter a $Co_{80}Cr_{20}$ alloy film having a thickness of 0.2 $\mu$m was deposited thereon by the sputtering method, thereby producing a recording medium wherein the $SiO_2$ film was sandwiched between the Co-Pt alloy film and the $Co_{80}Mo_{9.5}Zr_{10.5}$ alloy film in Example 1.

In the above process, before the $Co_{80}Mo_{9.5}Zr_{10.5}$ alloy film is produced or after it has been produced, the radial magnetic fields that ran toward its center were applied to the recording medium in the same way as in Example 1.

The recording medium was performed in the perpendicular magnetic recording medium thus produced using the magnetic head for perpendicular magnetic recording with such a shape as shown in FIGS. 5A and 5B and then reproduction was performed using a ferrite magnetic head with a gap distance of 0.3 $\mu$m and whose number of turns is 20; as a consequence, no spike noise was observed. In addition, a recording current $I_{90}$ which produces an output of 90% of the maximum output with the recording density of 100 kFRPI was 90 mA, and when the recording density is 100 kFRPI and the recording frequency is 5 MHz and the band width is 10 MHz, the S/N ratio was 45 dB.

As described above, it has been found that if the non-magnetic insulating film is sandwiched between the permanent magnet film and the high permeability film, it is possible to obtain the perpendicular magnetic recording medium with higher performance than that of the recording medium in which no insulating film is formed shown in Example 1.

As described above, the magnetic fields were applied before or after producing the high permeability film in Examples 1, 2 and 3; however, the timing of applying the magnetic fields may be set into any times during the permanent magnet film is produced or after it has been produced.

EXAMPLE 4

Upon applying the magnetic fields to the recording medium in Example 1, the electromagnet was used in place of the magnet shown in FIG. 4, thereby to apply the magnetic fields in the single direction in the recording medium surface.

With respect to the magnetic recording medium obtained in this way, the recording and reproducing were respectively performed using the perpendicular recording head and the MnZn ferrite head which are similar to those in Example 1. As a result of this, it has been found that the current value necessary for recording and the S/N ratio differ in dependence upon the location in the recording medium, in other words, the direction of the magnetic field applied.

Namely, in the case where the direction of the applied magnetic field coincides with the direction of track width of the recording medium, $I_{90}$ in case of the recording density of 100 kFRPI is 100 mA, and when the recording density is 100 kFRPI and the recording frequency is 5 MHz and the band width is 10 MHz, the S/N ratio is 42 dB. Although these results were the same as those in Example 1, in the case where the direction of the applied magnetic field is identical to the direction of bit length, $I_{90}$ in case of the recording density of 100 kFRPI is 120 mA, and when the recording density is 100 kFRPI and the recording frequency is 5 MHz and the band width is 10 MHz, the S/N ratio is 37 dB. Therefore, it will be appreciated that if the magnetic fields are applied in the direction of track width, the perpendicular magnetic recording medium with higher performance can be obtained.

Obviously many modifications and variations of the present invention are possible in the light of the above teachings. It is therefore to be understood that within the scope of the appended claims the invention may be practiced otherwise than as specifically described.

We claim:

1. A perpendicular magnetic recording medium comprising a non-magnetic substrate; a permanent magnet film formed on said non-magnetic substrate, said permanent magnet film having a thickness from 0.02 μm and up to 1/5 the width of a track on said medium, and a coercive force of at least 100 Oe; a high permeability film formed on said permanent magnet film, said high permeability film having a thickness of 0.1-5 μm; and a perpendicular magnetization film formed on said high permeability film, said perpendicular magnetization film having a thickness of 0.03-0.3 μm, whereby said permanent magnet film formed on said non-magnetic substrate acts to eliminate occurrence of spike noise in said recording medium.

2. A perpendicular magnetic recording medium according to claim 1, wherein said permanent magnet film is a $\gamma$-$Fe_2O_3$ film containing Co, Co-Pt alloy film, or Al-Ni-Co alloy film.

3. A perpendicular magnetic recording medium according to claim 2, wherein said Co-Pt alloy film which contains Pt whose content is within a range of 2-43 weight percent is used.

4. A perpendicular magnetic recording medium according to claim 2, wherein said Co-Pt alloy film which contains Pt whose content is within a range of 15-25 weight percent is used.

5. A perpendicular magnetic recording medium according to claim 1, wherein the thickness of said perpendicular magnetization film is within a range of 0.1-0.2 μm, and wherein after said perpendicular magnetization film has been produced, said recording medium is subjected to heat treatment in a vacuum, inert gas or reducing gas at temperatures in the range of 400°-500° C.

6. A perpendicular magnetic recording medium according to claim 1, wherein said permanent magnet film has a thickness of 0.1 μm or more, up to 1/5 the width of a track on said medium.

7. A perpendicular magnetic recording medium according to claim 1, wherein said perpendicular magnetization film is formed of a material selected from the group consisting of a Co-Ru alloy, a Co-V alloy, a Co-W alloy, and a Co-Cr alloy having another element, other than Co and Cr, incorporated therein.

8. A perpendicular magnetic recording medium according to claim 1, wherein said medium is in the form of a disk.

9. A perpendicular magnetic recording medium according to claim 1, wherein said permanent magnet film is magnetized by applying magnetic fields in the same direction as the direction of track width in said perpendicular magnetization film.

10. A perpendicular magnetic recording medium according to claim 9, wherein the magnetic fields applied in the same direction as the direction of track width have a magnetic field strength of at least 2 Oe.

11. A perpendicular magnetic recording medium according to claim 1, wherein after said perpendicular magnetization film has been produced, said recording medium is subjected to heat treatment in a vacuum, inert gas or reducing gas at temperatures in a range of 350°-550° C.

12. A perpendicular magnetic recording medium according to claim 11, wherein said high permeability film is a magnetic alloy film, the crystallization temperature of said magnetic alloy film is higher than said heat treatment temperature.

13. A perpendicular magnetic recording medium according to claim 12, wherein the high permeability film is a magnetic alloy film that is amorphous, the crystallization temperature of the amorphous magnetic alloy film is higher than the heat treatment temperature.

14. A perpendicular magnetic recording medium according to claim 1, wherein a non-magnetic insulating film is sandwiched between said permanent magnet film and said high permeability film.

15. A perpendicular magnetic recording medium according to claim 14, wherein said permanent magnet film is magnetized by applying the magnetic fields in the same direction as the direction of track width in said perpendicular magnetization film.

16. A perpendicular magnetic recording medium according to claim 14, wherein the thickness of said perpendicular magnetization film is within a range of 0.1-0.2 μm, and wherein after said perpendicular magnetization film has been produced, said recording medium is subjected to heat treatment in a vacuum, inert gas or reducing gas at temperatures in a range of 400°-500° C.

17. A perpendicular magnetic recording medium according to claim 14, wherein said non-magnetic insulating film is made of material selected from the group consisting of SiO$_2$ and Al$_2$O$_3$.

18. A perpendicular magnetic recording medium according to claim 17, wherein said non-magnetic insulating film has a thickness of 20Å to 1 μm.

19. A perpendicular magnetic recording medium according to claim 14, wherein said permanent magnet film has a thickness of 0.1 μm or more, up to 1/5 the width of a track on said medium.

20. A perpendicular magnetic recording medium according to claim 19, wherein said Co-Pt alloy film which contains Pt whose content is within a range of 15–25 weight percent is used.

21. A perpendicular magnetic recording medium according to claim 19, wherein said permanent magnet film is a γ-Fe$_2$O$_3$ film containing Co, Co-Pt alloy film, or Al-Ni-Co alloy film.

22. A perpendicular magnetic recording medium according to claim 21, wherein said Co-Pt alloy film which contains Pt whose content is within a range of 2–43 weight percent is used.

23. A perpendicular magnetic recording medium according to claim 14, wherein after said perpendicular magnetization film has been produced, said recording medium is subjected to heat treatment in a vacuum, inert gas or reducing gas at temperatures in a range of 350°–550° C.

24. A perpendicular magnetic recording medium according to claim 23, wherein when said high permeability film is a magnetic alloy film, the crystallization temperature of said magnetic alloy film is higher than said heat treatment temperature.

25. A perpendicular magnetic recording medium according to claim 24, wherein the high permeability film is a magnetic alloy film that is amorphous, the crystallization temperature of the amorphous magnetic alloy film is higher than the heat treatment temperature.

* * * * *